Figure 1:
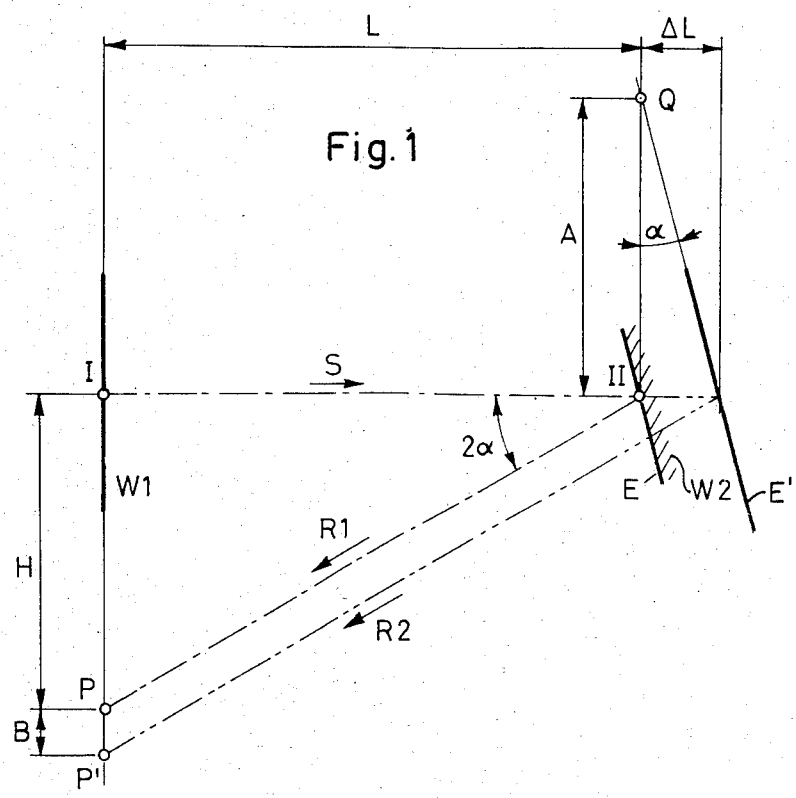

United States Patent [19]

Amberg et al.

[11] Patent Number: 4,697,921
[45] Date of Patent: Oct. 6, 1987

[54] DEVICE FOR DETECTING A RELATIVE CHANGE IN DISTANCE BETWEEN TWO MEASURING POINTS, AND ITS USE

[75] Inventors: Rudolf Amberg; Werner Alder, both of Sargans, Switzerland

[73] Assignee: Amberg Messtechnik AG, Sargans, Switzerland

[21] Appl. No.: 654,018

[22] PCT Filed: Jan. 13, 1984

[86] PCT No.: PCT/CH84/00007
§ 371 Date: Sep. 12, 1984
§ 102(e) Date: Sep. 12, 1984

[87] PCT Pub. No.: WO84/02771
PCT Pub. Date: Jul. 19, 1984

[30] Foreign Application Priority Data

Jan. 13, 1983 [CH] Switzerland ............... 182/83

[51] Int. Cl.$^4$ ............................................. G01C 3/24
[52] U.S. Cl. .......................................... 356/15; 356/9; 356/1
[58] Field of Search ............... 356/1, 3, 4, 15, 9

[56] References Cited

U.S. PATENT DOCUMENTS 3,765,764 10/1973 Niss ................................. 356/3
4,409,842 10/1983 Scott et al. ..................... 73/800

FOREIGN PATENT DOCUMENTS 0645981 10/1984 Switzerland ................... 356/1

Primary Examiner—R. A. Rosenberger
Assistant Examiner—Crystal D. Cooper
Attorney, Agent, or Firm—Toren, McGeady and Goldberg

[57] ABSTRACT

As is known, the walls in cavity structures often become quiescent only after a prolonged period. In order to detect whether and to what extent rock displacements can occur, measuring instruments are installed at mutually opposite points (I, II) on walls (W1, W2). A pendulum (1) mounted on gimbals carries a light source (5) at the mounting point and a light receiver (3) at the pendulum mass (2). On the opposite wall (W2), a mirror (4) is arranged at an inclination α relative to the vertical. A displacement of the mirror by $T_X$ or by $T_Z$ leads to an indication $T_Z$ at the light receiver (3).

9 Claims, 3 Drawing Figures

DEVICE FOR DETECTING A RELATIVE CHANGE IN DISTANCE BETWEEN TWO MEASURING POINTS, AND ITS USE

The present invention relates to a device for detecting a relative change in distance between two measuring points, according to the preamble of the independent patent claim 1, and to a use of this device according to the characterising clause of the independent patent claim 8.

It is known from Swiss Patent Application No. 278,632 that, in high structures such as, for example, towers or barrages, it is possible for a point of the structure to be horizontally displaced. This horizontal displacement is resolved into two mutually perpendicular components which are regarded as significant. One important component of these is that which is perpendicular to a vertical plane, and hence that which is able to indicate tilting of the structure. Accordingly, it is suggested to suspend a pendulum in the said vertical plane and to measure the change in the distance between the structure and the filament.

On the other hand, Swiss Patent Application No. 366,982 has also disclosed the determination of the distance by forming a double image of, for example, a levelling rod.

It has been found, however, in particular in mining, that continuous monitoring of the walls of cavities in rock is necessary in order to be able to establish when the rock has come to rest again. For this reason, it is not sufficient to detect the displacement in only one direction, but all three coordinates in the spatial Cartesian coordinate system should be observed in order to enable all the possible displacements, bulges and dislocations to be detected in this way.

It is therefore an object of the invention to provide a device, by means of which such movements of structures can be detected, that case to be taken into account particularly where not only a wall of a structure but also the reference point might move.

According to the invention, this is achieved by a device which is characterised by the features in the characterising clause of the independent patent claim 1. A particularly advantageous application is defined in the independent patent claim 8.

Figure 2:
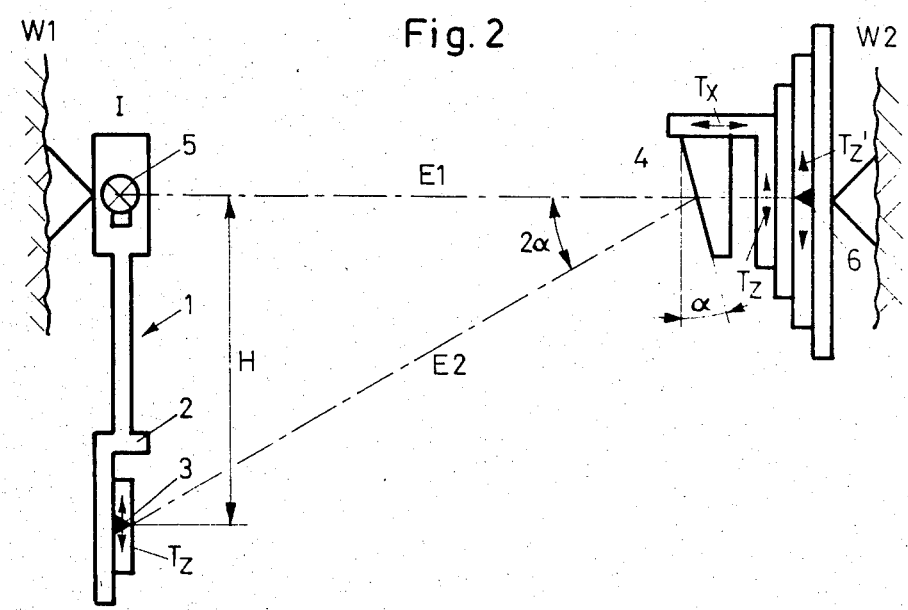
Figure 3:
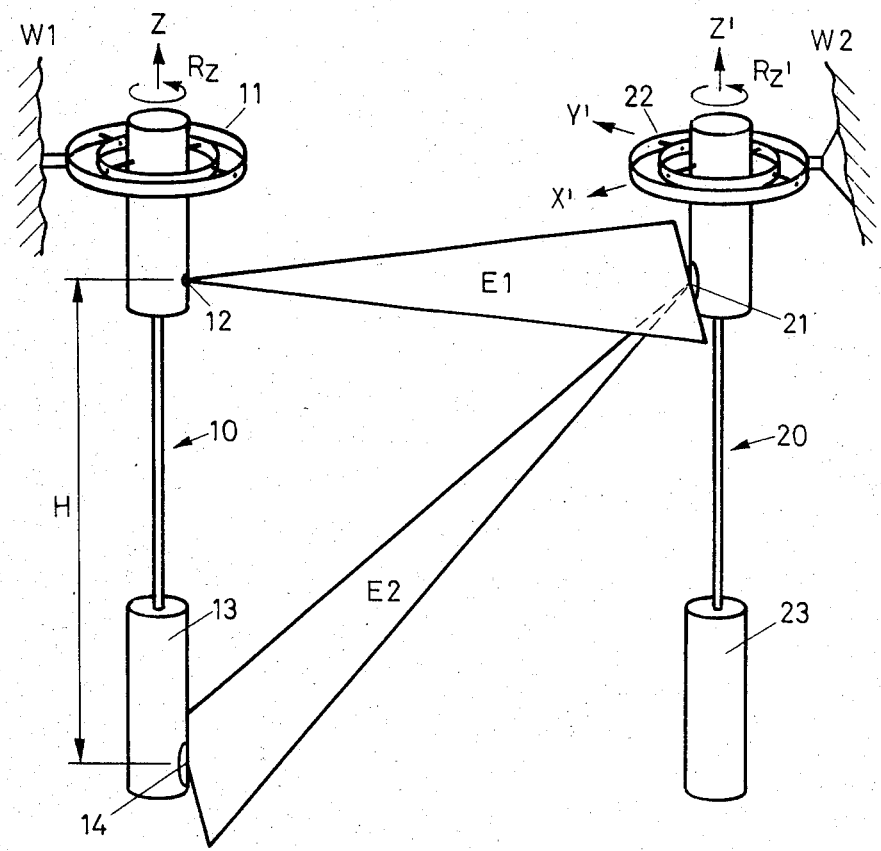

Illustrative embodiments of the invention are described below by reference to the drawing in which:

FIG. 1 shows a geometrical representation for an explanation of the principle of the invention, FIG. 2 shows a diagrammatic representation of a first simple embodiment and FIG. 3 shows a diagrammatic representation of a second universally applicable embodiment.

The main problem is to ensure sufficiently large deflections for even small changes, so that useful measured results can easily be obtained. Structures, whether tall buildings or cavity structures, can change in various directions, as mentioned at the outset. The measuring system must therefore be capable of automatically carrying out the resolution into components. One component should be suitable for surveying.

As shown in FIG. 1, two measuring points I and II are defined as points on the surfaces of two mutually opposite walls W1, W2. A light beam S is emitted at a right angle from the measuring point I and strikes the mirror plane E at point II, which plane E is fixed on wall W2 at the measuring point II, at a right angle.

At the measuring point II, a plane mirror E is located. The light beam S is radiated back as a reflected beam R1 by this mirror E. At the receiving point P, the reflected beam R1 strikes again the wall W1 with the measuring point I. Provided that the wall W1 remains unchanged, a displacement of the wall W2 by the amount $\Delta L$ can be detected, because the receiving point for the originally reflected beam R1, which has also shifted into the parallel beam R2, so that point P becomes shifted by an amount B to point P'.

If the angle between the incident light beam S and the reflected beam R1 on the mirror E is termed $2\alpha$, the angle at the apex Q between the plane of the wall W2 and the extended mirror plane, displaced by $\Delta L$, is to be termed $\alpha$, as can readily be derived from the theorem of pairs of mutually perpendicular arms.

Thus, a displacement by the amount A corresponds to the value $\Delta L/\tan\alpha$, and the measured displacement B accordingly corresponds to $\Delta L \times \tan 2\alpha$s. Thus, in order to enable any possible change between the two walls W1 and W2 to be detected, it is only necessary to ensure that the measurement basis at the measuring point I does not change.

According to the invention, this is achieved by a pendulum suspended on gimbals, a light source being arranged at the suspension and a light receiver being arranged at the pendulum mass. The measurement basis is then always aligned with the centre of the earth and is thus invariant.

In the illustrative embodiment according to FIG. 2, the walls W1 and W2 are two mutually opposite parallel rock walls of a cavity structure. On the wall W1, a pendulum 1 is suspended on gimbals at the measuring point I. A displaceable light receiver 3 is located on the pendulum mass 2, so that the change can be numerically determined, based on the displacement.

On the opposite wall W2, there is a mirror 4, the mirror plane of which is inclined by an angle $\alpha$ relative to a vertical plane. A light beam E1 emitted horizontally by the light source 5 is reflected at the mirror plane of the mirror 4 and is radiated back as a reflected beam E2 to the receiver 3. The angle between the incident light beam E1 and the reflected beam E2 is thus $2\alpha$.

A change of the mirror 4 in the direction $T_X$ results in a deflection in the direction $T_Z$ in the light receiver 3, and the same deflection is also obtained by a change in the direction $T_Z$. These two deflections cannot be distinguished by a totally reflecting mirror.

If the mirror 4 is semi-transparent, a second light receiver 6 can be arranged behind the mirror 4 and this in turn then detects the part beam passing through the mirror 4 and generates information $T_Z$ regarding a displacement in the Z direction.

Finally, FIG. 3 also shows an embodiment for the detection of positional changes in the measuring plane defined by the two pendulum axes with their components in the X and Z directions.

For this purpose, a first pendulum 10 is mounted in a gimbal suspension 11 on the wall W1 on the left of the drawing. A light emitter 12 is assembled with the gimbal suspension 11. The light receiver 14 is located in the pendulum mass 13. The light emitter 12 is provided with a device which forms a light plane perpendicular to the Z axis.

In this way, a plane E1 is defined which, on displacement of the reflector 21 on the opposite wall W2 in the X' direction or Y' direction, can generate a reflected beam. The reflector 21 is likewise mounted in a gimbal suspension 22 on the wall W2 and forms the bearing part of a second pendulum 20 to which only a weight is fitted as the pendulum mass 23. The reflector 21 reflects the light fed to it in the light plane E1. The incident beams in the plane E1 thus generate a second plane E2 with reflected beams.

Such an arrangement allows the detection of changes in distance with respect to the mutual position of the two walls W1 and W2. To survey the changes in distance, it is possible to arrange, for example, photocells in the light receiver, in the manner of a grid, in order to generate information regarding the degree of displacement from the position of the incident reflected beam in the receiver 14.

By means of additionally rotating the light emitter 12 about the Z axis, light can be emitted to several reflectors on the wall W2 located in the plane E1, and this makes it possible to monitor changes over a relatively great length of the walls.

Of course, it would also be possible to reverse the principle according to FIG. 1, by generating a light beam at the measuring point I in the direction from I to P. A semi-transparent mirror is fixed at the point I under 45° relative to this direction, and a totally reflecting mirror is fixed to the pendulum under 45°+2α relative to this direction at the point P. A change due to the displacement of the beams R1, R2 will then be detectable in the same way at the measuring point II.

We claim:

1. In a device for detecting a change in distance between two measuring points by emitting a light beam at a first measuring point, reflecting the light beam at a second measuring point and detecting any change which may occur, the improvement comprising that a pendulum suspended on gimbals at a pendulum suspension is located at the first measuring point, a light emitter being arranged at the suspension and a light receiver or a light reflector being arranged at the free end of the pendulum.

2. A device according to claim 1, wherein the reflector is a mirror plane arranged at an oblique angle to the optical axis of the light emitter.

3. A device according to claim 2, wherein the reflector is in the form of said semi-transparent mirror as a first image plane and wherein a second image plane, arranged approximately perpendicular to the optical axis, is present behind said mirror plane.

4. A device according to claim 1, wherein a second pendulum suspended on gimbals is located at the second measuring point and wherein the reflector is arranged at a point between the suspension and the mass of the pendulum.

5. A device according to claim 4, wherein in that the reflector is arranged on the support body on the mass side of the gimbal suspension.

6. A device according to claim 5, wherein the light beam radiated on the emitter side and the light beam radiated on the reflector side together form a beam plane.

7. A device according to claim 6, wherein in that the beam planes are generated by moving the light source and the reflector about a vertical axis.

8. A method of using the device according to claim 1 for detecting a change in the walls of cavities in rock.

9. A method according to claim 8, wherein a horizontal plane is defined by rotating the light emitter about the vertical axis defined by the pendulum, and that several reflectors arranged at a mutual distance are likewise provided on pendulums, suspended on gimbals, for reflecting the light beam, in order to enable the behaviour of the structure over a relatively great length to be observed simultaneously.

* * * * *